United States Patent [19]

Roopngam

[11] Patent Number: 5,551,762
[45] Date of Patent: Sep. 3, 1996

[54] AUXILIARY WHEEL ASSEMBLY

[76] Inventor: Yong Roopngam, 6063 Camerino St., Lakewood, Calif. 90713

[21] Appl. No.: 411,103

[22] Filed: Mar. 27, 1995

[51] Int. Cl.[6] .................................................. B60C 17/06
[52] U.S. Cl. ........................................ 301/40.3; 301/38.1
[58] Field of Search ................................. 301/38.1, 39.1, 301/40.2, 40.3, 41.1, 13.1, 13.2

[56] References Cited

U.S. PATENT DOCUMENTS

| 1,992,078 | 2/1935 | Ludwick | 301/40.3 |
| 2,617,689 | 11/1952 | Oliveri | 301/40.3 |
| 4,033,395 | 7/1977 | Berg et al. | 152/327 X |
| 5,000,518 | 3/1991 | Markow | 301/40.3 |

FOREIGN PATENT DOCUMENTS

| 557541 | 5/1923 | France | 301/40.3 |
| 559178 | 9/1923 | France | 301/40.3 |
| 584339 | 2/1925 | France | 301/40.3 |
| 1365420 | 5/1964 | France | 301/38.1 |
| 284633 | 1/1935 | Italy | 301/40.3 |

Primary Examiner—Russell D. Stormer

[57] ABSTRACT

An auxiliary wheel assembly for supporting a vehicle wheel having a flat tire. The inventive device includes an auxiliary wheel of smaller diameter relative to the vehicle wheel. A mounting assembly secures the auxiliary wheel concentrically adjacent to the vehicle wheel and includes a plurality of brackets permitting movement of the auxiliary wheel in a plane parallel to the vehicle wheel while precluding axial movement of the auxiliary wheel relative to the vehicle wheel during cornering.

4 Claims, 3 Drawing Sheets

AUXILIARY WHEEL ASSEMBLY

BACKGROUND OF THE INVENTION

1. Field of the Invention

The present invention relates to vehicle wheel structures and more particularly pertains to an auxiliary wheel assembly for supporting a vehicle wheel having a flat tire.

2. Description of the Prior Art

The use of vehicle wheel structures is known in the prior art. More specifically, vehicle wheel structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle wheel structures include U.S. Pat. No. 2,233,742; U.S. Pat. No. 2,160,199; French Patent 584,339; U.S. Pat. No. 2,670,994; Italian Patent 421,110; Italian Patent 606,335; U.S. Pat. No. 2,145,525; U.S. Pat. No. 2,170,647 and U.S. Pat. No. 4,153,302.

While these devices fulfill their respective, particular objectives and requirements, the aforementioned patents do not disclose an auxiliary wheel assembly for supporting a vehicle wheel having a flat tire which includes an auxiliary wheel of smaller diameter relative to the vehicle wheel, and a mounting means for securing the auxiliary wheel concentrically adjacent to the vehicle wheel, wherein the mounting means includes a plurality of brackets permitting movement of the auxiliary wheel in a plane parallel to the vehicle wheel while precluding axial movement of the auxiliary wheel relative to the vehicle wheel during cornering.

In these respects, the auxiliary wheel assembly according to the present invention substantially departs from the conventional concepts and designs of the prior art, and in so doing provides an apparatus primarily developed for the purpose of supporting a vehicle wheel having a flat tire.

SUMMARY OF THE INVENTION

In view of the foregoing disadvantages inherent in the known types of vehicle wheel structures now present in the prior art, the present invention provides a new auxiliary wheel assembly construction wherein the same can be utilized for supporting a vehicle wheel having a flat tire. As such, the general purpose of the present invention, which will be described subsequently in greater detail, is to provide a new auxiliary wheel assembly apparatus and method which has many of the advantages of the vehicle wheel structures mentioned heretofore and many novel features that result in a auxiliary wheel assembly.

To attain this, the present invention generally comprises an auxiliary wheel assembly for supporting a vehicle wheel having a flat tire. The inventive device includes an auxiliary wheel of smaller diameter relative to the vehicle wheel. A mounting assembly secures the auxiliary wheel concentrically adjacent to the vehicle wheel and includes a plurality of brackets permitting movement of the auxiliary wheel in a plane parallel to the vehicle wheel while precluding axial movement of the auxiliary wheel relative to the vehicle wheel during cornering.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new auxiliary wheel assembly which may be easily and efficiently manufactured and marketed.

It is a further object of the present invention to provide a new auxiliary wheel assembly which is of a durable and reliable construction.

An even further object of the present invention is to provide a new auxiliary wheel assembly which is susceptible of a low cost of manufacture with regard to both materials and labor, and which accordingly is then susceptible of low prices of sale to the consuming public, thereby making such auxiliary wheel assemblies economically available to the buying public.

Still another object of the present invention is to provide a new auxiliary wheel assembly for supporting a vehicle wheel having a flat tire.

Yet another object of the present invention is to provide a new auxiliary wheel assembly which includes an auxiliary wheel of smaller diameter relative to the vehicle wheel, and a mounting means for securing the auxiliary wheel concentrically adjacent to the vehicle wheel, wherein the mounting means includes a plurality of brackets permitting movement of the auxiliary wheel in a plane parallel to the vehicle wheel while precluding axial movement of the auxiliary wheel relative to the vehicle wheel during cornering.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
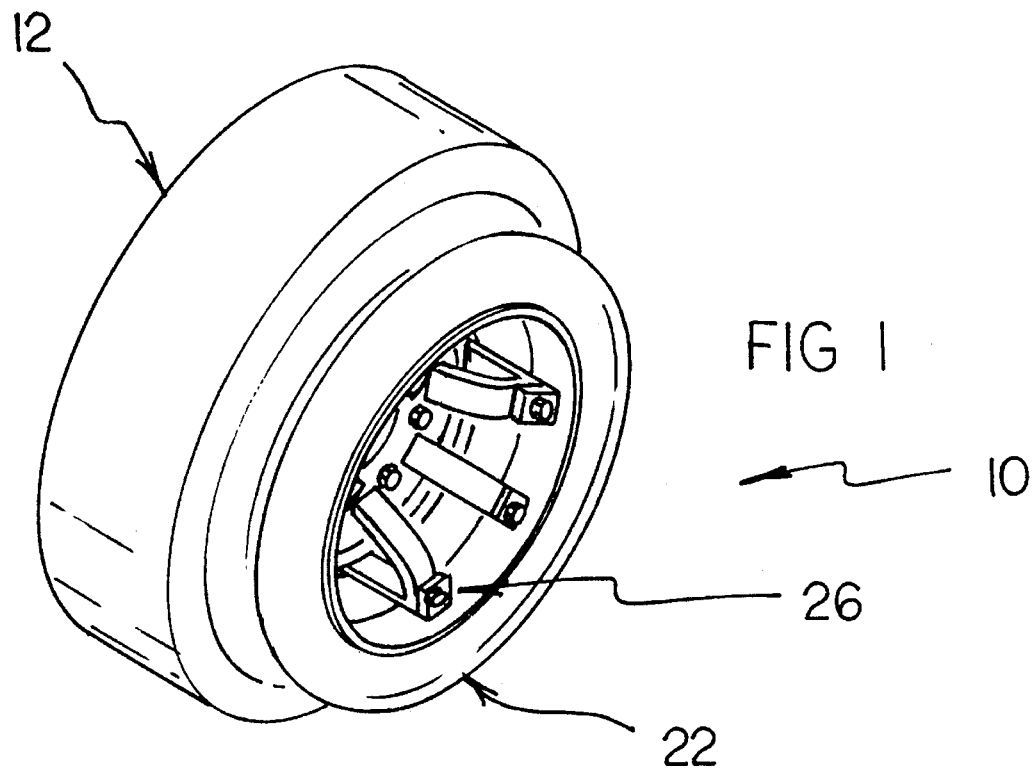
FIG. 1 is an isometric illustration of a auxiliary wheel assembly according to the present invention.

With reference now to the drawings, and in particular to FIGS. 1–4 thereof, a new auxiliary wheel assembly embodying the principles and concepts of the present invention and generally designated by the reference numeral 10 will be described.

Figure 2:
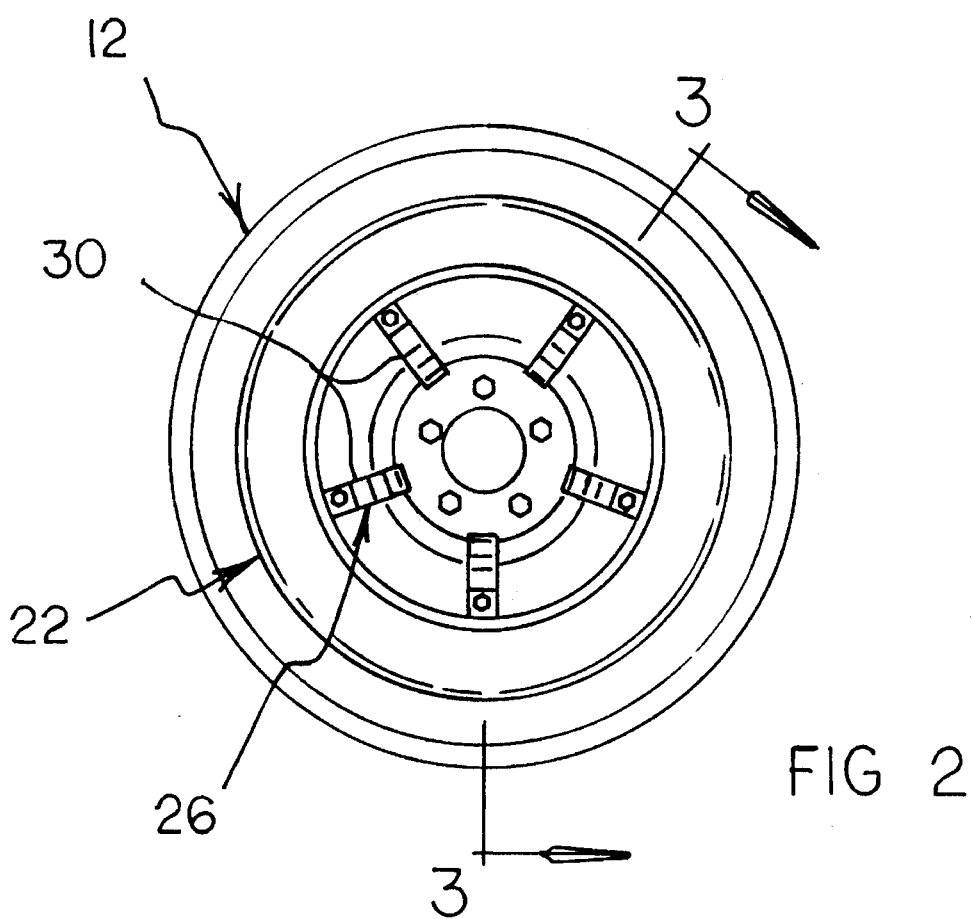
FIG. 2 is a side elevation view thereof.
Figure 3:
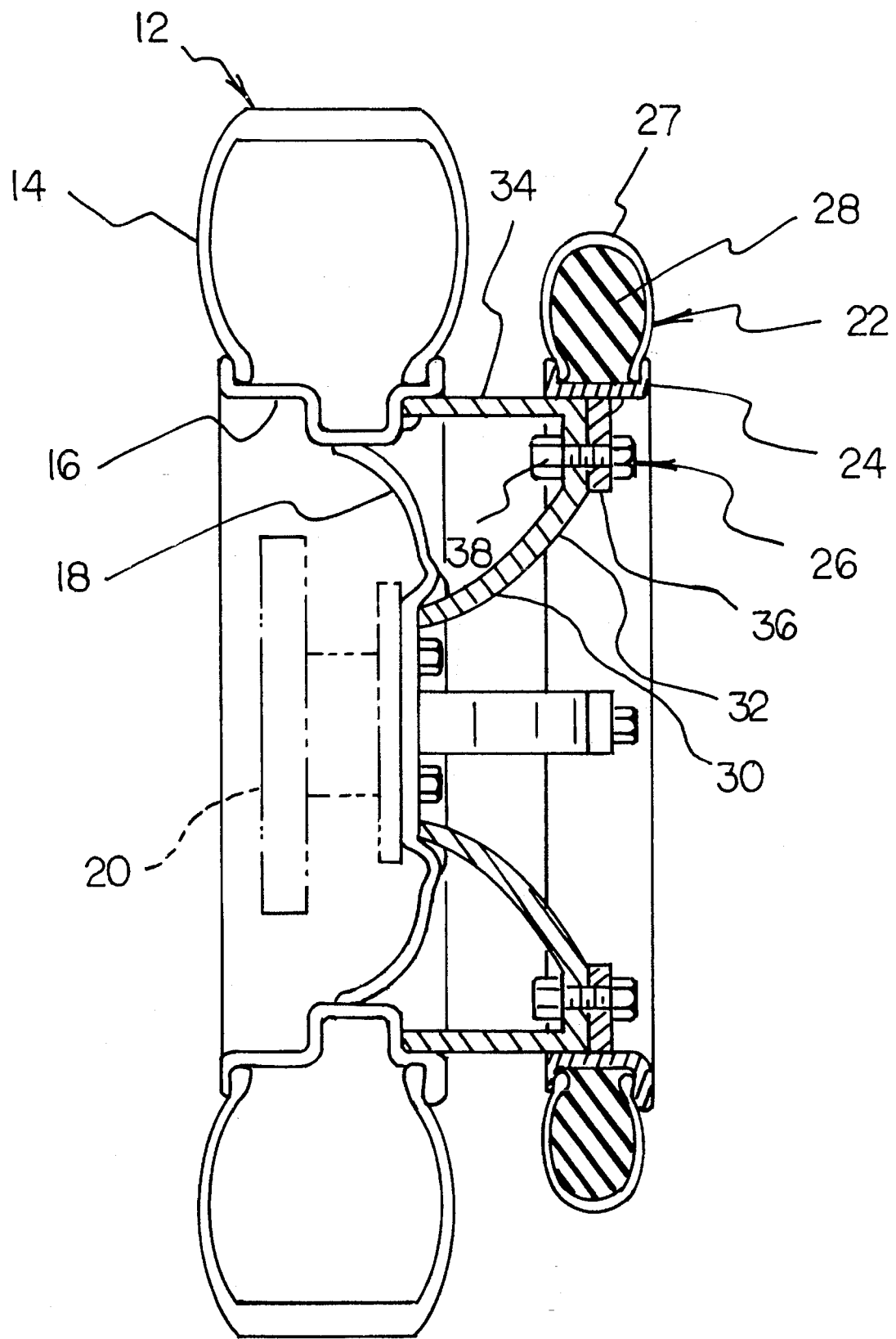
FIG. 3 is a cross sectional view taken along line 3—3 of FIG. 2.

More specifically, it will be noted that the auxiliary wheel assembly 10 comprises a vehicle wheel 12 including a vehicle tire 14 supported upon a vehicle rim 16, with a center web 18 extending interiorly across the vehicle rim 16 and including provisions for mounting the vehicle wheel 12 to a vehicle hub 20 of an associated and unillustrated vehicle. An auxiliary wheel 22 includes an auxiliary rim 24 about which an auxiliary tire 27 is mounted. If desired, a polymeric material 28 can be mounted within the auxiliary tire 27 in lieu of pressurized air. The auxiliary wheel 22 including the auxiliary rim 24 and auxiliary tire 27 is shaped so as to have an outside diameter of a first dimension, with the vehicle wheel 12 including the vehicle rim 16 and the vehicle tire 14 being shaped so as to define an outside diameter of a second dimension, wherein the second dimension is substantially greater than the first dimension as shown in FIGS. 1 through 3 of the drawings. A mounting means 26 is provided with the present invention 10 for securing the auxiliary wheel 22 concentrically adjacent to the vehicle wheel 12 as shown in FIGS. 1 and 2 of the drawings. By this structure, a deflation of a vehicle tire 14 of the vehicle wheel 12 such as occurs during a flat tire will permit the auxiliary tire 27 of the auxiliary wheel. 22 to engage the ground surface to the support the vehicle wheel 12 and the associated vehicle relative thereto such that continued operation of the unillustrated vehicle can be accomplished.

Figure 4:
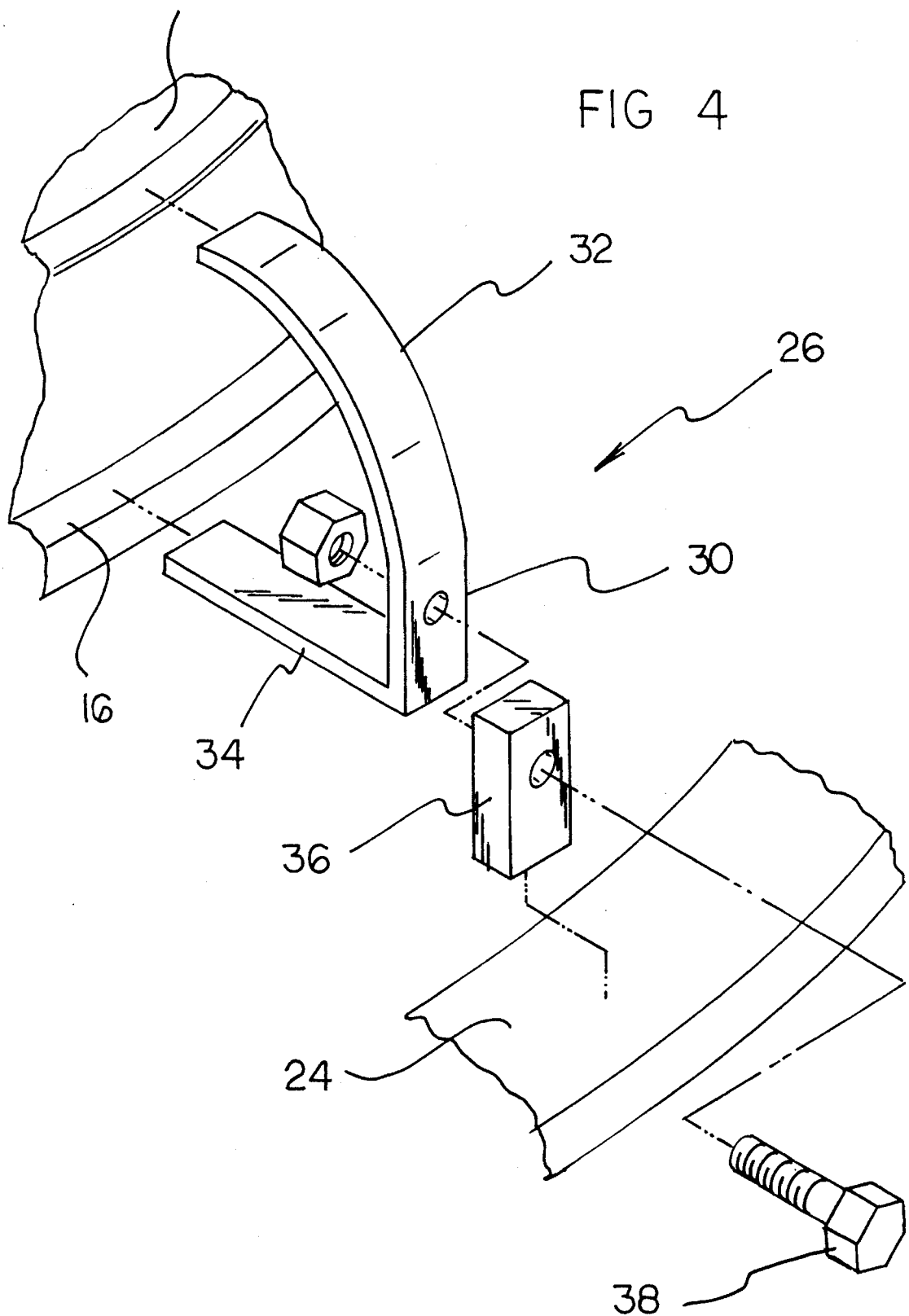
FIG. 4 is an exploded isometric illustration of a mounting means of the present invention.

As best illustrated in FIGS. 2 through 4, it can be shown that the mounting means 26 according to the present invention 10 comprises a plurality of mounting brackets 30 extending between the auxiliary rim 24 of the auxiliary wheel 22 and the vehicle wheel 12. To this end, each of the mounting brackets 30 comprises an arcuate brace 32 for securing to the center web 18 of the vehicle wheel 12. The arcuate brace 32 projects axially and radially outward from a center of the center web 18 and terminates in an unlabeled outer distal portion oriented so as to reside within a plane substantially parallel to a plane containing the vehicle rim 16. The mounting brackets 30 each further include an orthogonal brace 34 couplable to the vehicle rim 16 and projecting substantially orthogonally from the plane containing the vehicle rim. The orthogonal brace 34 projects orthogonally from the vehicle rim 16 and is coupled to the outer distal end of the arcuate brace 32. As shown in FIG. 3, the arcuate brace 32 can be integrally formed with the orthogonal brace 34 to create each of the individual mounting brackets 30. Preferably, the arcuate brace 32 and the orthogonal brace 34 can be joined to the center web 18 and the vehicle rim 16, respectively, of the vehicle wheel 12 by welding or like fastening. With continuing reference to FIGS. 3 and 4, it can be shown that the mounting means 26 further comprises a mounting plate 36 secured to the auxiliary rim 24 and projecting parallel to a plane containing the auxiliary rim of the auxiliary wheel 22. The mounting plate 36 is secured to the outer distal end of the arcuate brace 32 of the mounting bracket 30 by a fastener 38 directed therethrough. The fastener 38 may comprise a rivet or other permanent or removable securing means, but preferably comprises a threaded fastener directed through the mounting plate 36 and the outer distal end of the arcuate brace 32 permitting selective removal of the auxiliary wheel 22 as desired by an end user. Preferably, tile arcuate brace 32 and the orthogonal brace 34 are comprised of a substantially resilient material wherein deflection of the mounting brackets 30 is permitted in a direction parallel to the plane containing the vehicle rim 16 of the vehicle wheel 12. Because the arcuate brace 32 projects axially and radially outward relative to the center web 18 of the vehicle wheel 12, and the orthogonal brace 34 is cantilevered orthogonally from the vehicle rim 16, deflection of the mounting brackets 30 in a direction parallel to a plane containing the vehicle rim 16 is permitted. However, because the orthogonal brace 34 extends orthogonal to the plane containing the vehicle rim 16 of the vehicle wheel 12, the orthogonal brace 34 acts as a column against axial forces directed orthogonally towards the plane containing the vehicle rim 16. Thus, the auxiliary wheel 22 is securely supported against axial movement towards the vehicle wheel 12 during cornering or like maneuvers of the associated vehicle with the auxiliary tire 27 engaged against the ground surface.

In use, the auxiliary wheel assembly 10 according to the present invention can be easily utilized to support a vehicle wheel 12 having a deflated or flat vehicle tire 14 thereon. The specific shape and structure of the mounting brackets 30 provides for improved structural mounting of the device 10 to an associated vehicle wheel 12 to preclude interference or mutual engagement of the auxiliary wheel 22 relative to the vehicle wheel 12 during use of the device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in tile art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An auxiliary wheel assembly for use with a vehicle wheel including a vehicle tire supported upon a vehicle rim and a center web extending interiorly across the vehicle rim and including provisions for mounting the vehicle wheel to a hub of the vehicle, the auxiliary wheel assembly comprising:

an auxiliary wheel including an auxiliary rim and having an outside diameter substantially smaller than an outside diameter of the vehicle wheel;

a plurality of mounting brackets extending from said auxiliary rim and being coupleable to the vehicle wheel, said mounting brackets each comprising an arcuate brace for securing to said center web of the vehicle wheel, said arcuate brace projecting axially and radially outward from a center of said center and terminating in an outer distal portion oriented so as to be positionable within a plane substantially parallel to a plane containing said vehicle rim; an orthogonal brace extending from the vehicle rim and projecting substantially orthogonally from a plane containing the vehicle rim and extending to the outer distal end of the arcuate brace;

and a mounting plate secured to the auxiliary rim and projecting parallel to a plane containing the auxiliary rim of the auxiliary wheel, the mounting plate being secured to the outer distal end of the arcuate brace, said arcuate brace and said orthogonal brace being comprised of a substantially resilient material wherein deflection of the mounting brackets is permitted in a direction parallel to the plane containing the vehicle rim of the vehicle wheel.

2. The auxiliary wheel assembly of claim 1 further comprising a polymeric material positioned within the auxiliary tire.

3. An auxiliary wheel assembly comprising:

a vehicle wheel including a vehicle tire supported upon a vehicle rim and a center web extending interiorly across the vehicle rim and including provisions for mounting the vehicle wheel to a vehicle hub of a vehicle, the auxiliary wheel assembly comprising:

an auxiliary wheel shaped so as to have an outside diameter substantially smaller than an outside diameter of the vehicle wheel including an auxiliary rim and an auxiliary tire mounted about the auxiliary rim;

a plurality of mounting brackets extending from the auxiliary rim and secured to the vehicle wheel, each of the mounting brackets comprising an arcuate brace secured to the center web of the vehicle wheel, said arcuate brace projecting axially and radially outward from a center of the center web and terminating in an outer distal portion oriented so as to reside within a plane substantially parallel to a plane containing the vehicle rim; an orthogonal brace coupled to the vehicle rim and projecting substantially orthogonally from a plane containing the vehicle rim, to the outer distal end of the arcuate brace;

a mounting plate secured to the auxiliary rim and projecting parallel to a plane containing the auxiliary rim, the mounting plate being secured to the outer distal end of the arcuate brace of the mounting bracket; the arcuate brace and the orthogonal brace being comprised of a substantially resilient material wherein deflection of the mounting brackets is permitted in a direction parallel to the plane containing the vehicle rim of the vehicle wheel.

4. The auxiliary wheel assembly of claim 3 further comprising a polymeric material positioned within the auxiliary tire.

* * * * *